US008379820B2

(12) United States Patent
Tal et al.

(10) Patent No.: US 8,379,820 B2
(45) Date of Patent: *Feb. 19, 2013

(54) VIRTUAL PERSONAL ASSISTANT FOR HANDLING CALLS IN A COMMUNICATION SYSTEM

(75) Inventors: Oren Tal, Tel-Aviv (IL); Reuven Tal, Tel-Aviv (IL); James A. Taylor, Fullerton, CA (US)

(73) Assignee: On-Q Telecom Systems Co., Inc., Cheyenne, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/111,725

(22) Filed: May 19, 2011

(65) Prior Publication Data

US 2011/0222679 A1    Sep. 15, 2011

Related U.S. Application Data

(63) Continuation of application No. 11/565,489, filed on Nov. 30, 2006, now Pat. No. 7,974,398.

(60) Provisional application No. 60/740,551, filed on Nov. 30, 2005.

(51) Int. Cl.
*H04M 3/42* (2006.01)

(52) U.S. Cl. ............ 379/201.1; 379/211.02; 379/218.01

(58) Field of Classification Search ............. 379/218.01, 379/201.1, 211.02; 455/414.1
See application file for complete search history.

(56) References Cited

U.S. PATENT DOCUMENTS

| | | |
|---|---|---|
| 3,900,616 A | 8/1975 | Moore |
| 5,202,414 A | 4/1993 | Keller et al. |
| 5,206,895 A | 4/1993 | Danos |
| 5,301,351 A | 4/1994 | Jippo et al. |
| 5,341,412 A | 8/1994 | Ramot et al. |
| 5,400,661 A | 3/1995 | Cook et al. |
| 5,500,480 A | 3/1996 | Brown et al. |
| 5,601,097 A | 2/1997 | De Grandpre et al. |
| 5,709,414 A | 1/1998 | Bailey et al. |
| 5,815,566 A | 9/1998 | Ramot et al. |
| 5,904,339 A | 5/1999 | Flinn |

(Continued)

FOREIGN PATENT DOCUMENTS

| | | |
|---|---|---|
| EP | 2107817 | 10/2009 |
| JP | 59123357 | 7/1984 |

(Continued)

OTHER PUBLICATIONS

Repeat Dialing—wysiwyg://9/http://www.bellatlanti..home/NY/Products/RDX-01, 2 pages. Jun. 2000.

(Continued)

*Primary Examiner* — Gerald Gauthier
*Assistant Examiner* — Simon King
(74) *Attorney, Agent, or Firm* — Leason Ellis LLP

(57) ABSTRACT

Connecting a caller with a plurality of destinations using a destination list received from a caller or a designated user. Attempts are made to connect the caller with each of the destinations in the stored destination list, with each attempt including a connectability query to determine whether either the caller or the destination is connectable. Thereafter, the other party is called and offered a connection attempt to the first party. If the second party accepts, a call is made to the first party. If the first party is indeed connectable and answers the call, a connection is established between the two parties. Once the destination list is stored, attempts to connect the caller with each destination can be separately initiated or paused. Furthermore, the stored destination list can be edited even after connection attempts have been initiated.

21 Claims, 4 Drawing Sheets

U.S. PATENT DOCUMENTS

| | | | |
|---|---|---|---|
| 5,905,639 | A | 5/1999 | Warren |
| 5,906,386 | A | 5/1999 | Baker et al. |
| 5,909,584 | A | 6/1999 | Tavallaei et al. |
| 6,003,204 | A | 12/1999 | Roach et al. |
| 6,005,830 | A | 12/1999 | Mukaida et al. |
| 6,008,172 | A | 12/1999 | Broshi et al. |
| 6,026,079 | A | 2/2000 | Perlman |
| 6,081,725 | A | 6/2000 | Ishida |
| 6,101,242 | A | 8/2000 | McAllister et al. |
| 6,102,250 | A | 8/2000 | Leo, Sr. |
| 6,105,464 | A | 8/2000 | Shimizu et al. |
| 6,108,543 | A | 8/2000 | Takahashi et al. |
| 6,122,357 | A | 9/2000 | Farris et al. |
| 6,167,119 | A | 12/2000 | Bartholomew et al. |
| 6,201,578 | B1 | 3/2001 | Hosoya et al. |
| 6,246,872 | B1 | 6/2001 | Lee et al. |
| 6,407,736 | B1 | 6/2002 | Regan et al. |
| 6,553,221 | B2 | 4/2003 | Nakamura et al. |
| 6,804,509 | B1 * | 10/2004 | Okon et al. ............... 455/414.1 |
| 7,106,851 | B2 | 9/2006 | Tang et al. |
| 7,957,521 | B2 | 6/2011 | Taylor et al. |
| 2002/0021793 | A1 | 2/2002 | Shmuel et al. |
| 2002/0112187 | A1 * | 8/2002 | Dalton et al. ............... 713/201 |
| 2003/0012149 | A1 | 1/2003 | Maggenti et al. |
| 2003/0129978 | A1 | 7/2003 | Akiyama et al. |
| 2007/0047695 | A1 | 3/2007 | Tal et al. |
| 2008/0123832 | A1 | 5/2008 | Pines et al. |
| 2009/0109959 | A1 | 4/2009 | Elliott et al. |
| 2009/0110178 | A1 | 4/2009 | Taimmins et al. |
| 2009/0143050 | A1 | 6/2009 | Ignatin |
| 2010/0056114 | A1 | 3/2010 | Roundtree et al. |

FOREIGN PATENT DOCUMENTS

| | | |
|---|---|---|
| JP | 03235563 | 10/1991 |
| JP | 09162994 | 6/1997 |
| JP | 10322773 | 12/1998 |
| JP | 11027395 | 1/1999 |
| JP | 11098562 | 4/1999 |
| WO | WO-9905876 | 2/1999 |

OTHER PUBLICATIONS

Comverse "Visual Voice Mail for Blackberry" Oct. 30, 2006 3 pages http://www.comverse.com/voicemail_and_videomail.aspx?domainld=29&productld=61.

* cited by examiner

VIRTUAL PERSONAL ASSISTANT FOR HANDLING CALLS IN A COMMUNICATION SYSTEM

This application is a continuation of U.S. patent application Ser. No. 11/565,489, filed Nov. 30, 2006, now U.S. Pat. No. 7,974,398 which claims benefit under 35 U.S.C. §119(e) to U.S. Provisional Application No. 60/740,551 filed Nov. 30, 2005, entitled "VIRTUAL PERSONAL ASSISTANT FOR HANDLING CALLS IN A COMMUNICATION SYSTEM," which are incorporated by reference herein in their entirety.

FIELD OF THE INVENTION

The present invention relates generally to the field of telecommunication services and, more particularly, to services for connecting a caller with a plurality of destinations.

BACKGROUND OF THE INVENTION

Many call establishment and call completion services are known and commonly used today. Call completion services attempt to facilitate completion of a failed communication attempt. Referring to FIG. 1, call completion services 100 can be broadly categorized into two major categories referred to as Caller in Charge of Call Completion Services (C4S) 101 and Destination in Charge of Call Completion Services (DC3S) 102.

One of the most popular of the DC3S 102 services is the voicemail service 110. Services such as voicemail can fulfill several purposes including call completion purposes. For example, voicemail may be used for the purpose of call completion when a caller leaves a message asking the destination to call the caller back. Voicemail can also be used for the purpose of simply conveying information to the destination.

Short Message Service (SMS) 111 is another service in the DC3S 102 category. Like voicemail service 110, SMS 111 can be used for the purpose of call completion when a caller sends a text message requesting the destination to call the caller back.

Yet another service in the DC3S 102 category is the "missed calls" service 112, which is integrated in the majority of handsets, and allows the destination to view a list of all callers that called while the destination was busy or available but not answering. A similar network service often referred to as the "who-called" or the "missed calls alert" service 113 allows the destination to receive a list of all callers that called while the destination was unavailable.

For services in the C4S 101 category, the caller maintains the responsibility of completing the call, rather than handing the responsibility to the destination. The main advantage of utilizing a service in the C4S 101 category is that the chance of a call actually being completed is much higher than with services in the DC3S 102 category since the caller in most instances is more committed to completing the call. The caller has a higher chance of completing the call with a service in the C4S 101 category since the destination may ignore a caller's initial efforts, be reluctant to accept expenses to complete the call, or otherwise communicate with the caller through a different information channel, such as through e-mail.

Services of the C4S 101 category can be further divided into two categories referred to as the C4S Call Back Services (CBS) 120 and the C4S Notify Back Services (NBS) 121.

Services in the NBS 121 category notify a caller at the first instance the desired destination is available or reachable. The caller may be notified via SMS or via other services, but not via an actual call. One big disadvantage of services in the NBS 121 category is that notifications are non-synchronized. For example, at the time the notification is attempted, the caller may be unreachable. Hence, by the time the caller receives a notification of the availability or reachability of the destination, the notification may already be out of date.

Services in the CBS 120 category actually call back the caller to prompt the caller to complete the call. Services in the CBS 120 category include the Call Back for an initially-UNReachable destination service (CBUNR) 130 and the Call Back for an initially-Non-AnSWering service (CBNASW) 131. These types of services in the CBS 120 category have been disclosed in U.S. Pat. No. 6,081,725 to Ishida, U.S. Pat. No. 6,804,509 to Okon et al., and U.S. patent application Ser. No. 09/930383 by Okon et al. and are all incorporated herein by reference in their entireties.

According to U.S. Provisional Application No. 60/706,224 entitled "Enabling-Disabling Of Voicemail System" by Tal, which is hereby incorporated by reference in its entirety, a user of a telephone service is given the ability to configure call completion services. For example, the destination of incoming calls may enable or disable callback or voicemail services. In another example, the caller of outgoing calls may enable, disable, request or fail to request callback or voicemail services. If callback services are offered, the destination may also be given the option to reversibly enable or disable such services for incoming calls. As for outgoing calls, the caller has the inherent option of accepting or declining a call completion service offering. Nevertheless, a caller may be given an option to explicitly disable callback services for all outgoing calls and thereby bypass offerings for callback services during an outgoing call.

All aforementioned call completion services, however, require a caller wishing to connect with several destinations to activate a call completion service one at a time to each destination. There may be situations in which a caller wishes to plan ahead a series of calls to numerous destinations. For example, when a caller is going on a long drive, the caller may not wish to be distracted with the step of dialing each destination. In such situations, a caller may use a personal assistant or secretary to help the caller schedule outgoing calls. The use of personal assistants and secretaries for this function is common among high-ranking managers, executives, and others who can afford such assistance. Typically, a person who utilizes such an assistant is someone whose time is valuable and someone who wishes to minimize unnecessary distractions. To this end, personal assistants typically control the traffic of incoming and outgoing telephone calls. For example, an assistant can be given a list of persons to contact and asked to reach each person one at a time and hand over successful calls to the assistant's supervisor.

Utilizing a personal assistant poses a tradeoff between maintaining a supervisor's privacy and increasing the assistant's effectiveness. For example, having an assistant sit in a supervisor's office makes the assistant very effective but breaches the supervisor's privacy. On the other hand, having the assistant sit outside the supervisor's office serves to better protect the supervisor's privacy but makes the assistant less effective. This tradeoff becomes more pronounced when the supervisor must be out of the office. The supervisor must choose between traveling with the assistant so that the assistant can be very effective and having the assistant remain at the office where the assistant is likely to be less effective.

Typically, most people cannot afford to employ a personal assistant or are reluctant to do so for various other reasons. Accordingly, personal assistants are rare. Furthermore, even when real personal assistants are employed, they exhibit numerous shortcomings. For example, when calls between a supervisor and a destination becomes unexpectedly terminated due to a lossy signal, power outage, or other interruptions of service, the supervisor must manually update the personal assistant of the unexpected interruption so that the personal assistant can at a later time attempt to connect the supervisor with the destination again. Additionally, maintaining and tracking different lists of destinations, which can be reused at a later time, can be burdensome when changes to such lists must be coordinated between the supervisor and the personal assistant. Accordingly, utilizing a real personal assistant can be cumbersome and incomplete. The end result is that most people allocate some or a lot of their own attention to call traffic control. For example, a person who does not utilize a personal assistant but wishes to be connected with numerous destinations will likely have to dial repeatedly until each destination becomes available.

One area where call initiation has been automated is in the field of call center technology. U.S. Pat. No. 5,341,412 to Ramot et al. entitled "Apparatus And A Method For Predictive Call Dialing" and U.S. Pat. No. 5,815,566 to Ramot et al. entitled "Apparatus And Method For Dynamic Inbound/Outbound Call Management And For Scheduling Appointments," which are hereby incorporated by reference in their entireties, describe an automatic dialer that performs "predictive dialing" to a list of destinations and hands-off each answered call to one of several idle representatives. The underlying assumption of this technique is that whenever a call is answered, an idle representative is able to take the call immediately, typically without having the destination wait for more than 1-2 seconds. Since this technique assumes that one of multiple callers is immediately available to connect with an available destination, this technique does not address the needs of a single caller wishing to connect with multiple destinations.

An individual caller cannot utilize such aforementioned techniques employed by call centers without modification since an individual caller must singularly receive all calls and since an individual caller is unlikely to be idle and immediately available to connect with each destination at every instance when a destination is available.

Another area where call initiation has been automated is in the field of predictive personal dialers, which perform a sequence of calls from a telephone directly and adjacently connected to a computer system. Just like the predictive dialing techniques employed by call centers, predictive personal dialers assume that the caller is nearby and immediately available to take a call when a destination answers. Hence, such systems are essentially for a stationary caller who is immediately available to take a call.

Accordingly, what is needed is a system and method that is tailored to allow a single caller who may not always be connectable, such as when the caller is on the move, to connect to a sequence of calls with multiple destinations.

SUMMARY OF THE INVENTION

In accordance with one aspect of the present invention, a method is provided for connecting a caller with a plurality of destinations. A destination list having a plurality of destinations is received and stored in a data store. Thereafter, an attempt is made to connect a caller with each of the stored destinations. In making each attempt, a connectability query is performed for a first party, wherein a party is either the caller or the destination to which an attempt is being made. If the first party is determined to be connectable, a second party (i.e., the other party) is called and offered a connection attempt to the first party. If the second party accepts, a call is made to the first party. If the first party is indeed connectable and answers the call, a connection is established between the two parties.

In yet another aspect of the present invention, attempts to connect the caller with each destination can be separately initiated or paused. In yet another aspect of the present invention, the destination list can be edited.

In yet a further aspect of the present invention, a system is provided for connecting a caller with a plurality of destinations. The system includes a data store and a plurality of modules, at least one of which has access to the data store. A first module receives a destination list having a plurality of destinations. A second module stores the destination list in the data store. Thereafter, a third module attempts to connect a caller with each of the stored destinations. The third module interacts with several other modules to determine the connectabilities of the caller and a destination and connects the caller with the destination if both are connectable.

BRIEF DESCRIPTION OF THE DRAWINGS

The foregoing and other features of the present invention will be more readily apparent from the following detailed description and drawings of the illustrative embodiments of the invention wherein like reference numbers refer to similar elements throughout the drawings.

DETAILED DESCRIPTION

Figure 1:
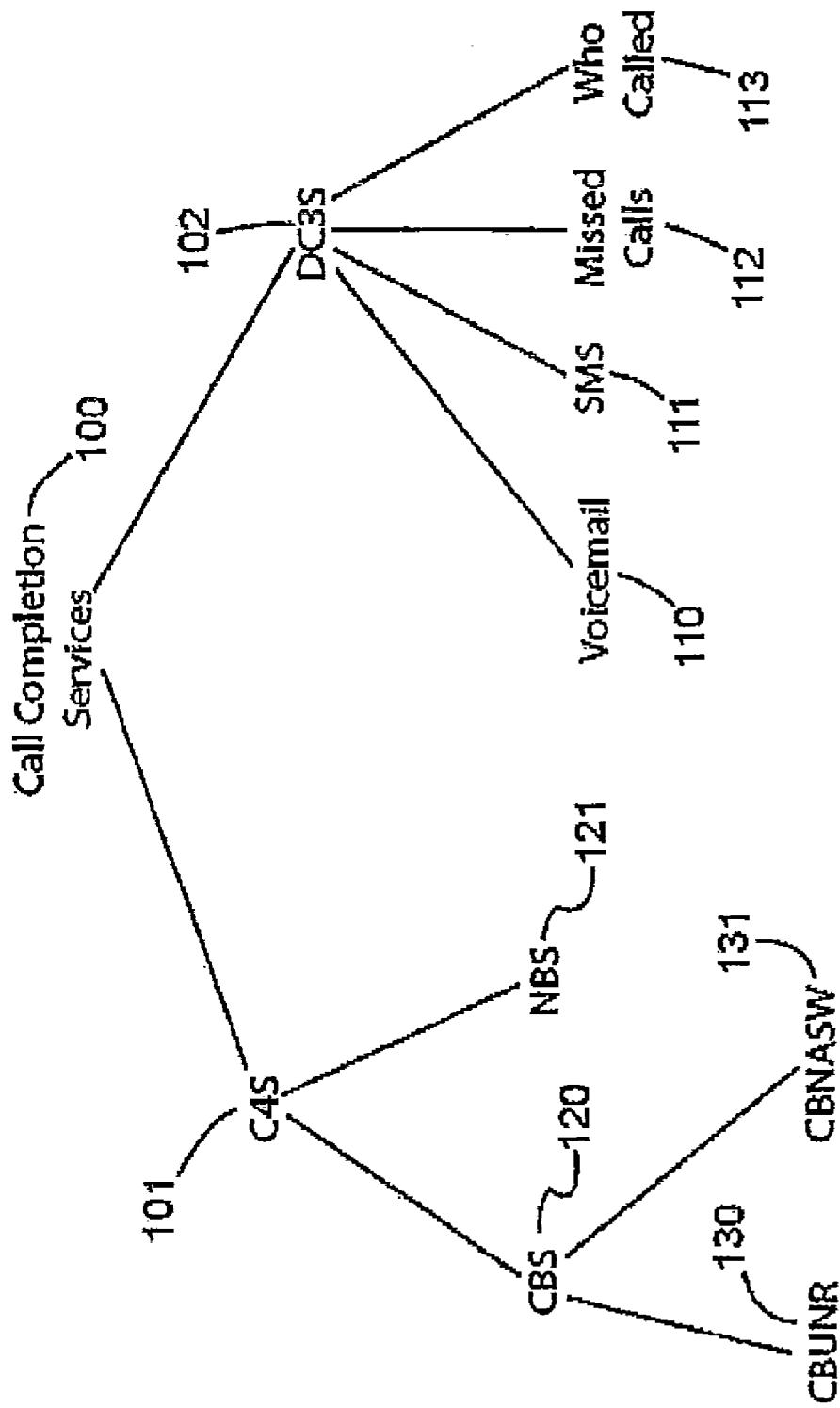
FIG. 1 illustrates various known types of call completion services.

By way of overview and introduction, the present invention comprises a method and system for sequentially connecting a caller with a plurality of destinations. A destination list having a plurality of destinations that the caller wishes to be connected with is provided to a Virtual Personal Assistant (VPA). Thereafter, the VPA attempts to connect the caller with each of the destinations in the destination list. Furthermore, the caller or an authorized user can schedule or trigger the VPA to initiate connection attempts at a specified time. Additionally, the caller or the authorized user can edit the destination list provided to the VPA, even after connection attempts have initiated.

In attempting to connect the caller with each destination, the VPA offers a connection attempt to one of the parties, either the caller or the destination, and if that offer is accepted, the VPA initiates a call attempt to the other party. In order for the call attempt to succeed, the other party must be connectable, meaning that the party is not busy, available, and responsive to an incoming call. Prior to every call attempt, the VPA preferably queries whether the other party is connectable. By determining whether the other party is connectable, the VPA can refrain from offering to make a connection attempt to a party that is not connectable.

In determining whether a party is connectable, a check can be performed to determine if the party is not busy. For example, when a call is to a wireline or wireless phone, a party can be determined to be busy if a call to the party cannot be routed.

Additionally, a check can be performed to determine if the party is available in determining whether a party is connectable. For example, in the case of a cellular phone, a check can be performed to determine whether the phone is in a coverage area where there is a sufficiently strong signal to the phone, and whether there are allocable system resources such as voice channels available to make a call to the phone. Such checks can be performed by examining registration information of a cellular phone, by using SS7 probes, or by conducting handshake procedures. In another example, in the case of wireline phones, such phones can always be treated as being available.

Furthermore, in determining whether a party is connectable, a check can be performed to determine whether the party is responsive. Such a check can be complex with only a partial chance for success, Responsiveness indicates the party's willingness to answer an incoming call. Hence, making a determination about the responsiveness of a party can be very difficult. In an embodiment, the responsiveness of a party for a call can be based on the recent history of the party's past responsiveness. For example, a party who recently finished a conversation can be assumed to be responsive. In another example, a party who did not recently answer a call from a particular caller can be assumed for a duration of time to be unresponsive to the particular caller.

In an embodiment, a responsiveness determination of a specific destination can be made by monitoring the destination's activity in the network. For example, immediately after any action in the network attributable to the destination is detected, such as the ending of a call or sending or receiving of an SMS message, the destination can be assumed to be within the immediate vicinity of the destination's phone and not asleep or otherwise involved in a compelling activity.

In another embodiment, a responsiveness determination of a specific destination can be accomplished by monitoring different physical or environmental phenomena that can indicate whether the destination is in the near vicinity of the destination's phone. These phenomena can be, for example, abrupt changes in the lighting conditions due to a lamp being turned on, changes in the electromagnetic field due to movement, or the like. These phenomena can be monitored by sensors, detectors, or devices, either internal or external to the communication device, such as a phone.

Sensors or detectors can be integrated as part of a wireline or wireless communication device to detect various phenomena. For example, a photoelectric diode can be integrated with a phone to measuring light changes. In another example, an electronic movement detector can be included with a phone to measure changes in the movement of the communication device. Additionally, an audio sensor can be included to detect whether the user of the communication device is listening to loud music, and therefore, indicate that the user is less likely to be responsive.

Additionally, sensors, detectors, or devices external to a wireline or wireless communication device can be installed especially for detecting various phenomena in the vicinity of the device. For example, such sensors, detectors, or devices can include a stress or movement sensor added to a chair, a photoelectric diode with a light beam (such as those used with elevators to detect movement), and audio sensors.

Additionally, sensors, detectors, or devices which already exist external to the phone can be monitored. For example, strikes on a keyboard or movements of a mouse on a computer can be monitored to identify whether a party is actively engaging in work and is less likely to be responsive to an incoming call.

Furthermore, a user of a phone can wear a device that communicates with a sensor, detector, or device attached or connected to a phone to communicate to the phone that the user is nearby enough to the phone to be alerted if the phone is ringing. Such approaches for identifying the proximity of a user to the phone can be used to measure responsiveness.

In yet another embodiment, the responsiveness of a destination can be determined by monitoring one or more of the destination's physiological indices. For example, a steady heartbeat or monotone breathing may indicate that the destination is asleep and is likely to be unresponsive to an incoming call.

It should be noted that responsiveness determination is in general dependent on the technology incorporated with a communication device, such as a cellular handset. At the network level, there are only limited options for determining responsiveness. Such options are based mostly on the usage history or on user-related information of a destination. A user-related information can include, for example, information that the offices of a destination are closed on weekends and are therefore likely to reachable but not-answering (R/NA) during those periods.

In many instances, a query of whether a party is connectable does not produce an absolute determination. Rather the query produces a result indicating the likelihood or probability of a call attempt succeeding. In general, a query may include all of the above mentioned checks or only one of them. For example, a check to determine whether a party is not busy can be the only check performed in a query for the connectability of a party. The query, therefore, is inherently more reliable as a measure of non-connectability than as an indicator of connectability since even a simple check to determine whether a party is busy can conclusively indicate non-connectability. Accordingly, the query provides a probabilistic indication of the chances for a call completion and serves as a filter to reduce the probability of failed connection attempts. Therefore, an embodiment in accordance of the present invention can provide configurable parameters to indicate which checks are to be performed and which thresholds should be compared against to determine whether a party is connectable.

Accordingly, an embodiment of the present invention queries the connectability of a first party and offers to connect a second party with the first party. If the second party accepts the offer, a connection attempt is made to the first party. If the first party is indeed connectable and answers the call, a connection is established between the first party and the second party.

In an embodiment, the VPA first queries whether the caller is connectable before offering a connection to the destination. In another embodiment, the VPA first queries whether the destination is connectable before offering a connection to the caller.

Figure 2:
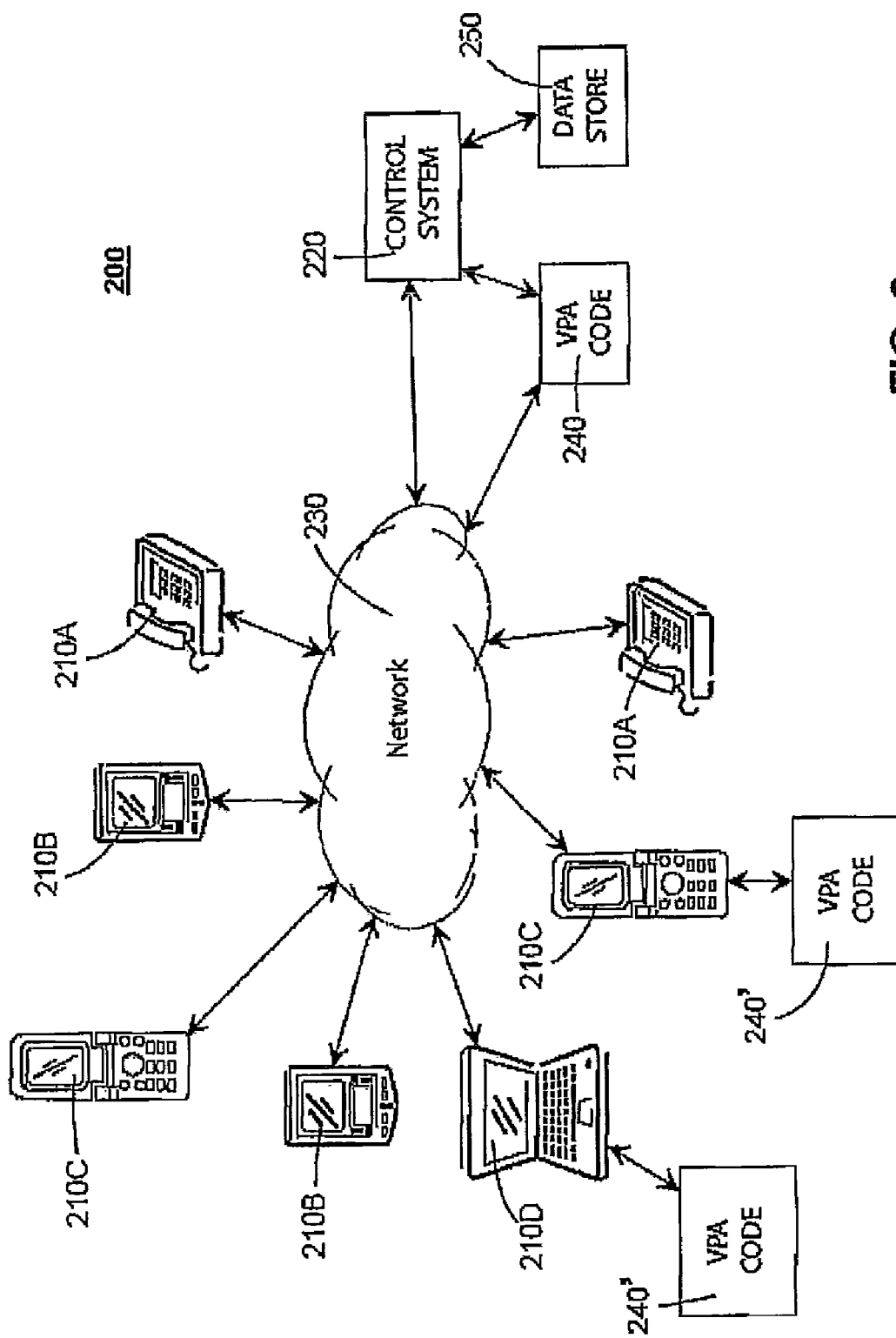
FIG. 2 depicts a high-level diagram of a communication system in which an embodiment of the present invention can be implemented.

FIG. 2 depicts a high-level diagram of a communication system 200 in which an embodiment of the present invention can be implemented. Communication system 200 includes a control system 220 connected to multiple user devices 210A-210D over network 230. User devices 210A-210D can include various types of communication devices, such as, for example, landline telephone 210A, PDA 210B, cellular phone 210C, and personal computer 210D. Control system 220 is capable of handling, managing, detecting, or initiating calls between user devices 210A-210D.

Furthermore, while control system 220 is shown connected to user devices 210A-210D over the same network, it will be appreciated by persons skilled in the art that control system 220 can include multiple network interfaces to communicate with user devices 210A-210D on various and disparate networks.

An embodiment of the present invention can be implemented in control system 220 or as part of a user device, such as user devices 210A-210D. When implemented in control system 220 or as part of a user device, the implementation includes a processor, VPA 240 and data store 250. VPA 240 performs various functions in accordance with the present invention such as, for example, receiving a destination list, storing the destination list in data store 250, and attempting to connect a caller with the destinations in the destination list. Data store 250 stores various data utilized by VPA 250 in accordance with the present invention including, for example, the destination list. Data store 250 can be any device that can store information and is capable of being accessed by a software module executing on a processor such as, for example, Random Access Memory (RAM), hard drive, flash memory, or a database.

When the VPA is embodied separately from a user device, such as on control system 220, the VPA provides for additional capabilities. By having the VPA embodied remotely from a user device, a user can interact with the VPA from various user devices even while the VPA attempts to connect the caller with each destination on the destination list. For example, a caller might prefer to use different handsets having different phone numbers at different points in time during the day. The caller may wish to use a residential phone during the mornings and evenings, an office phone during the day, a portable phone during lunch, and a car phone while commuting. By embodying the VPA on a server such as a control system 220, the VPA can advantageously communicate with various user devices that are accessible to the caller to complete calls to each destination of a destination list.

Furthermore, having the VPA embodied separately from a user device, such as on control system 220, allows several users to share one or more destination lists or allow other users to modify the destination list. For example, if a member of a sales force is sick, another member of the sales force can borrow a customer destination list of the sick colleague to communicate with all the customers.

Additionally, a VPA embodied on a server in a network, such as control system 220, can be more easily upgraded and supported since resources on a user device, such as memory and CPU power, are usually much more limited than resources dedicated to a server. Furthermore, a VPA embodied on a communication network can be more knowledgeable with regard to the reachability of different users than a VPA embodied on a user device. Accordingly, a VPA embodied on a communication network can provide the functionality in accordance with the present invention with fewer failed connection attempts.

VPA 240 can comprise computer code executing on a processor of the control system 220 or a processor of a user device, or can comprise a server or other computational machine loaded with software or having firmware configured to perform the functions noted above. VPA 240 also can be embodied as a plurality of software modules executing on a processor. Additionally, the VPA can be implemented in a distributed manner across multiple processors. As will be appreciated by persons skilled in the art, a software module includes anything that can be executed by a processor of a computer such as, for example, compiled code, binary machine level instructions, assembly code, source level code, scripts, function calls, library routines, software objects and the like.

It should be noted that for convenience and brevity, any communication attempt, such as, for example, a phone call, an internet voice communication, a VoIP communication, an instant message, or a communication bridging multiple services shall be referred to as a "call." Additionally, any person or machine performing such attempt shall be referred to as a "caller," and any person or machine who is the intended target or intended recipient of such attempt shall be referred to as a "destination." As the varying communication networks mature, the delineation between the communication services become blurred. Furthermore, non-telephonic communication systems have begun offering similar sets of services including analogous forms of away messages, voicemail, and ring-back. The caller and destination need not be using the same communication service. For example, a VoIP phone can easily communicate with a cellular phone 210B or landline telephone 210A through network 230. Similarly, instant messages can be sent and received on cellular phone 210C as well as on computer 210D.

It should further be noted that caller and destination are not limited to people. Rather, the caller and destination can be a person, a general purpose computer, a specific-purpose machine, or a combination thereof. For example, machines and computers are frequently used to place and receive automated calls for marketing or customer service. In the case of customer service answering system, the destination is typically a computer, which provides a series of prompts to identify the correct person to forward the call. Similarly, telemarketing calls are frequently placed by a machine to multiple phones simultaneously. As the telemarketing calls are answered, the computer placing the calls forwards the call to a live person to talk to the destination. Thus, a user can establish VoIP calls using personal computer 210D and likewise, personal computer 210D can automatically place or receive calls.

Referring to FIG. 2, a destination list can be edited and provided to VPA 240 utilizing an interface on a communication user device such as user devices 210A-210D. Editing a destination list refers to preparing a first version of the destination list as well as any subsequent revisions. For example, a destination list can be input and provided to the VPA from cell phone 210C or PDA 210B by keying numbers in a particular sequence or by selecting phone numbers already stored in cell phone 210C or PDA 210B. In another example, the destination list can be edited and uploaded to a remote VPA operating on control system 220 from a personal computer 210D.

A separate user device can be used for editing a destination list, providing the destination list to the VPA, and receiving calls to connect with destinations. Allowing each of these functions to be performed separately allows for maximum flexibility. For example, before going on a long drive, a caller can prepare a destination list and upload it to a remote VPA using personal computer 210D. Later, while in the car, the caller can use cell phone 210C to trigger the VPA to initiate connection attempts to the destinations and receive successful connections on cell phone 210C.

Furthermore, for each connection attempt, the VPA can attempt a connection among different combinations of user devices, such as user devices 210A-210D, based on the availability of a particular user device to the caller or the destination. For example, during a first attempt, the VPA can attempt to connect a caller on cell phone 210C with a first destination on landline 210A. After the first attempt fails, the VPA can attempt to connect the caller on cell phone 210C with the first destination's cell phone 210C. Once the connection between the caller and the first destination has terminated successfully, the VPA can attempt to connect the caller on PDA 210B with a second destination on personal computer 210D. Accordingly, when the VPA connects the caller with each destination on the destination list, some calls can be conducted from the caller's office phone, others from the caller's car phone, others from the caller's cellular handset and yet others from the caller's home phone.

In an embodiment, an electronic calendar can be provided to a VPA from a user device. Today, many people use an electronic calendar to assist them in managing their time efficiently. An electronic calendar typically contains information about the user's activities, whereabouts, availability, and the like, stored in one or more files or in more parseable formats. Once provided to a VPA, the VPA can use the calendar information to make connection attempts only at times when the caller is available. For example, the VPA can use a caller's calendar information to refrain from making connection attempts when the caller is in a meeting. Accordingly, by synchronizing the VPA with the caller's electronic calendar, the caller can inform the VPA the times or types of activities during which the caller is available or is unavailable without separately keying calendar information to the VPA module.

In another embodiment, an interface on a user device, such as on user devices 210A-210D, can be utilized to furnish additional parameters to direct the manner in which the VPA attempts connections. For example, for each destination in the destination list, a caller can specify a time frame in addition to the destination's identity and number. The time frame instructs the VPA of the time periods during which a connection can be attempted to a destination. For example, the time frame can indicate the earliest and the latest time to attempt a connection. In another example, the caller can specify a condition for each destination in the destination list. When a condition is specified, the VPA waits until the condition is satisfied before attempting to make a connection with the destination. For example, a caller can specify a condition so that the caller does not get connected with the caller's boss until the caller has been connected with several of the caller's customers. In another example, the caller can condition a connection attempt to a destination based on a successful completion of an incoming call from another caller (to the caller) who may or may not be included in the caller's destination list. Furthermore, the caller can instruct the VPA to enable or disable various preferences for dealing with call completion services that may be initiated when the VPA attempts to connect the caller with a destination that is not available. For example, a caller can instruct the VPA to register the caller with a call-back service when such a service is offered by a destination.

All information that can be provided to a VPA can be input directly to the VPA when the VPA is implemented in a user device such as user devices 210A-210D such as VPA 240'. When a VPA, such as VPA 240, is implemented as part of a control system, such as control system 220, all information can be provided to the VPA by uploading the information over a network such as network 230. All information can be input or uploaded in one batch or in several batches. Furthermore, all information may be edited from time to time by the caller. A caller can specify several user devices, such as user devices 210A-210D, as origins or destinations of any call. An entry in the destination list can provide information about a single destination such as the destination's name and contact information for multiple user devices that are accessible to that destination.

Additionally, a caller can authorize another user to prepare or edit a destination list. For example, a caller can authorize the caller's spouse, assistant, business partner, or any other delegate to edit the caller's destination list previously provided to a VPA.

Several destination lists can be provided and stored with a VPA. A destination list typically specifies a plurality of destinations and the order in which the caller wants to be connected with each destination. But, a destination list can also specify a plurality of destinations that the caller wants to be connected with in any sequence. Furthermore, a single destination can appear in multiple destination lists. For example, a particular destination can appear in both the caller's "family destination list" and in a "golf buddies destination list." When a destination list is provided to the VPA, the destination list can be accessed at a later time and edited through a user device such as user devices 210A-210D. Additionally, a destination list can be archived and re-used by the caller at a later time.

Once a destination list is provided to a VPA, the VPA can be triggered or directed to initiate attempts to connect a caller with each destination on the destination list. The VPA can be triggered according to a user's preference or if no preference is specified, by a system default preference. For example, a caller can instruct the VPA that the caller wishes to trigger the VPA as soon as possible to cause the VPA to initiate connection attempts as soon as the first destination in a destination list is provided. In another example, the caller can trigger the VPA after a destination list has been provided to the VPA and revised by an assistant. In yet another example, the caller can provide a destination list to the VPA and wait until the caller has some free time before triggering the VPA. The VPA can be triggered by utilizing a user interface on a user device, such as on user devices 210A-210D, to provide an indication to the VPA that call attempts should be initiated. If the VPA is centrally located such as VPA 240, the trigger comprises an instruction communicated from a user device over the network, such as network 230, to the VPA.

Even after the VPA is triggered, the destination list can be modified by a user, by another person authorized by the user, or automatically by the VPA. For example, a user can add or exclude destinations from the destination list. In another example, an incoming call from a destination in the destination list can cause the VPA to automatically exclude the destination from the destination list. In other words, the call from the destination has identifying information (e.g., an automatic number identification (ANI), an email address, etc.) that can be matched to the destination list contents and then marked as excluded or removed from the list. Additionally, a destination that is unavailable for a user specified period of time can also be automatically excluded from the destination list. A user can utilize an interface on a user device, such as on user devices 210A-210D, to configure the VPA for automatically modifying a destination list.

Furthermore, a user can configure a VPA to pause for an interval between the termination of a successful connection and an attempt to establish another connection. A pause between connections allows a caller to rest, receive incoming calls, and initiate outgoing calls in between connection initiated by the VPA. By utilizing an interface on a user device, the caller can specify an interval or a time period for which the VPA will pause between the end of one call and the start of connection attempts to establish another call. Furthermore, a user can utilize an interface on a user device to pause indefinitely the operation of the VPA. When the user is ready to utilize the VPA again, the user can cause the VPA to resume its operation by providing a command through an interface on the user device. While the VPA is paused, a user can access, modify or delete a destination list.

When a VPA attempts to connect a caller with a destination, the VPA initiates a call to the caller and a call to the destination and connects the caller and destination if both are available. But, at the time the VPA attempts to connect the caller and the destination, there is no certainty that the caller or the destination will be available to answer a call. The destination can be unreachable or ringing but not answering (R/NA). The caller too may be temporarily out of a coverage area necessary for the caller's user device or the caller may be physically away from the user device. Therefore, situations can occur when the caller or the destination can be burdened with answering a call in vain. Moreover, even when both the caller and the destination are available, they are unlikely to answer at the same time, and therefore, one will have to wait for the other to answer. Depending on the implementation, one party will be burdened more often by futile connection attempts and waiting times.

In an embodiment, referred to as "caller-first," the VPA queries whether the destination is connectable prior to calling the caller. If the caller answers, the VPA offers the caller with an option to be connected to a destination who is identified by the destination's name, number, a special tone, or by some other identifier. If the caller declines to accept the option, an attempt to connect the caller with the destination is postponed to a later time. Once the caller accepts the offer, the VPA attempts to connect the caller to the destination. If the destination answers, the caller and the destination are connected. If the connection attempt is ultimately found to be futile because the destination is unreachable or R/NA, the caller can manually activate a call completion service available at the destination. An exemplary process 300 for implementing an embodiment of the present invention that is "caller-first" is described below with reference to FIG. 3.

In another embodiment, referred to as "destination-first," the VPA queries whether the destination is connectable prior to calling the destination. If the destination answers, the destination is advised to remain on the call to be connected with the caller. In some respects, this type of embodiment is better than the "caller-first" embodiments because generally the caller who initiated the VPA is likely to be more responsive and accessible than the destination. Hence, "destination-first" embodiments are likely to have less connection attempts fail than "caller-first" embodiments. But in other respects, the "destination-first" embodiments can be more cumbersome than "caller-first" embodiments since it requires a destination, who is typically the party less enthusiastic to have a call, to remain online and wait for the caller to respond to the call. In some instances, the destination can become annoyed and even hang-up or disconnect the call. However, in situations where the caller is of a higher rank in an organization than the destination or the caller is an important customer of the destination, the destination may be willing to wait for the caller to answer. In another example, a "destination-first" embodiment may be appropriate for a caller who is a dispatcher that routinely needs to make a call sequence to field representatives. If the representatives are aware that a "destination-first" calling sequence will make the dispatcher's job much easier, the representatives may be more forgiving and accept waiting for the dispatcher to become available. An exemplary process 400 for implementing an embodiment of the present invention that is "destination-first" is described below with reference to FIG. 4.

In yet another embodiment, referred to as "ring-both," the VPA determines if the caller and the destination are connectable concurrently, and then starts to ring both the caller's phone and the destination's phone at the same instance or nearly so. Since the caller and the destination are unlikely to answer their respective calls at the exact same time, the party picking up the call first will have to wait for the other party to answer. If the caller responds first, the process of connecting the caller with the destination is handled in the manner of a "caller-first" embodiment. If the destination responds first, the process of connecting the caller with the destination is handled in the manner of a "destination-first" embodiment. The "ring both" embodiment may be at certain circumstances more favorable than the "caller-first" and "destination-first" embodiments since the expected waiting time for each party is reduced and is statistically split between both parties. For a recurring call, splitting up the waiting times between the parties may appear as being fairer than the "caller-first" or "destination-first" embodiments.

In all of the "caller-first" "destination-first" and "ring-both" embodiments described above, there can be times when one or both of the caller and the destination are unreachable or ringing but not answering (R/NA). If for some reason a party is not connectable, the VPA will pause its attempts to connect the parties and resume connection attempts only when the unconnectable party is again assumed connectable.

When the destination is unavailable in a "caller-first" embodiment, the caller is given the option of calling the destination again at a later time manually or by utilizing the VPA once more. Alternatively, the caller can choose to apply for a call completion service available for the destination in the manner the caller would apply for such a service if the caller had made a call manually to the destination.

When the destination is unavailable in a "destination-first" embodiment, the VPA can take one of several actions based on the user's configuration of the VPA. For example, the VPA can be configured to periodically check the availability of the destination until the destination is available. In another configuration, the VPA can skip an unavailable destination and attempt to connect the caller with another destination in the destination list. Furthermore, in another configuration, the VPA can mark an unavailable destination in the destination list as being removed from further connection attempts. Additionally, the VPA can demote an unavailable destination so that further attempts to connect to the destination will occur only after connection attempts have been made for a certain number of other destinations in the destination list. If the VPA reaches the end of the destination list and there are unreachable or not answering destinations remaining on the destination list, the VPA can be configured to attempt connecting the caller with those unavailable destinations once more or periodically.

In an embodiment, the VPA can be configured to automatically accept or deny offers for call completion services when a destination is unconnectable. Through an interface on a user device, such as on user devices 210A-210D, the user can specify to the VPA how it is to interact with each particular call completion service. For example, by utilizing an interface to the VPA through a user device, the caller can pre-record a voice message that can be used by the VPA to leave a voicemail automatically with unconnectable destinations. Additionally, the user can specify with the VPA a preference for which call completion services should be accepted. The user can specify such a preference in general, for a particular destination list, or for each destination in a destination list. Hence, a caller who must inform several employees and golf buddies that the caller is not available to work or to play golf can create a destination list and specify separate call completion service preferences for each of the caller's employees and golf buddies. The caller can specify that a pre-recorded voice message be left for unreachable or un-answering employees to notify such employees that the caller will be out of the office. The caller can specify that a callback service be requested for unreachable or un-answering golf buddies so that the caller can negotiate another time to play golf. Once the caller specifies such a destination list and preferences for call completion services with the VPA, the VPA will accordingly apply for any such call completion offerings. In one embodiment, the aforementioned system described in U.S. Provisional Application No. 60/706,224 can be utilized in accordance with the present invention to implement the functionality of automating acceptance or denial of call completion service offerings.

If the VPA accepts a call completion service offering for an unavailable destination, the destination is either permanently or temporarily marked in the destination list as being removed for further connection attempts by the VPA. If a call completion service offering transfers the call completion responsibility to the destination, such as with voicemail or "who called" services, the destination is permanently marked as being removed from further connection attempts by the VPA. If the call completion service offering only temporarily transfers the call completion responsibility to the destination, such as with a notify-back service or a call-back service, the destination is only temporarily marked as being removed from further connection attempts by the VPA. A temporarily removed destination can be re-inserted into the call sequence if for example, a notification arrives from a notify-back service indicating that the destination is reachable. In another example, a temporarily removed destination can be re-inserted into the call sequence if the VPA detects that a request for a callback service to a destination has been aborted.

In another embodiment of the present invention, the VPA can be configured to filter incoming calls according to a user's preferences. For example, a caller can configure the VPA to make the caller reachable to different groups at different times. This sort of functionality can be implemented in conjunction with the concepts taught in the aforementioned U.S. Provisional Application No. 60/706,224 for enabling and disabling call completion services.

Figure 3:
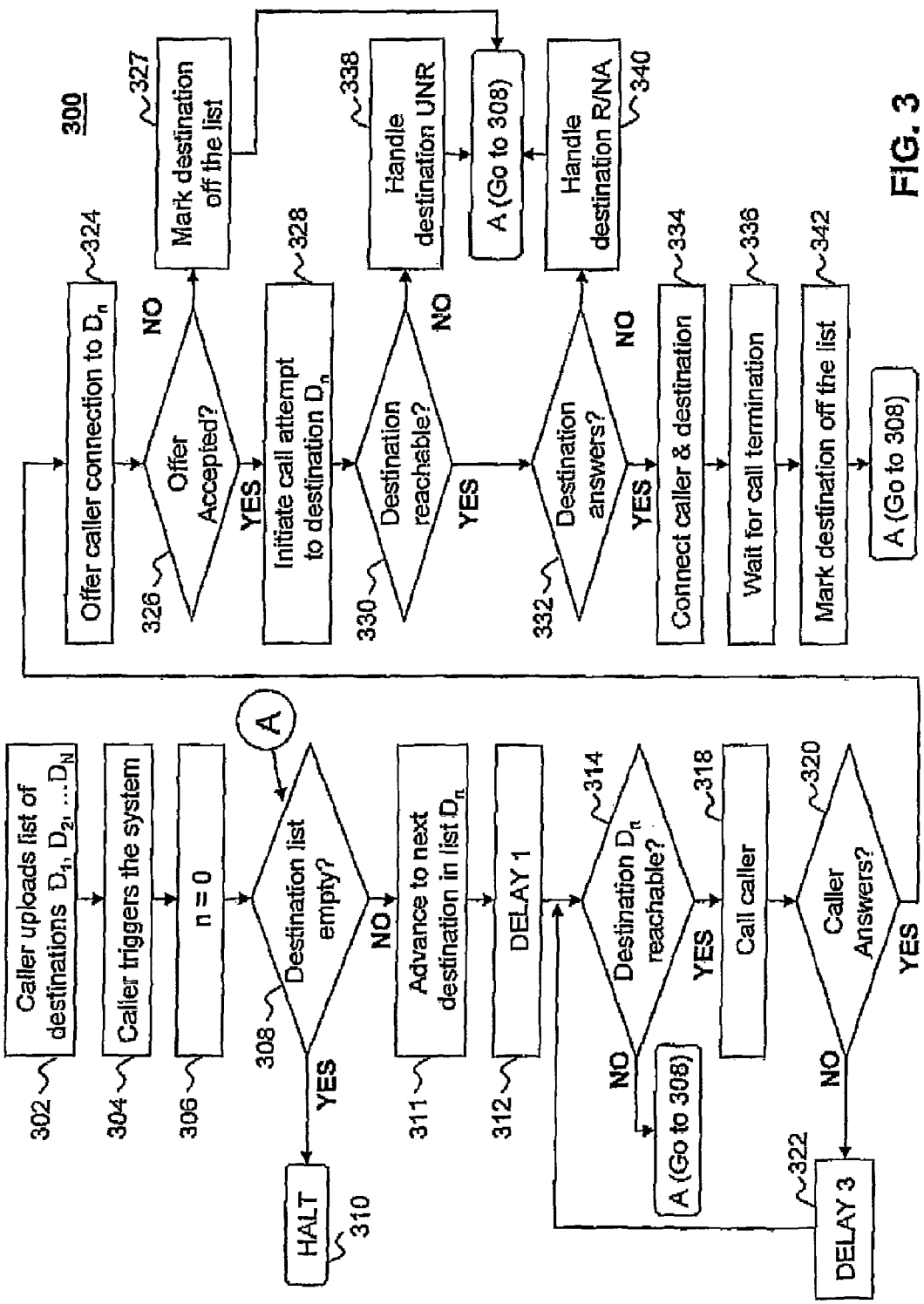
FIG. 3 depicts a flow chart illustrating a process for connecting a caller with a plurality of destinations wherein the connectability of the caller is determined first in accordance with an embodiment of the present invention.

Referring now to FIG. 3, a process 300 for connecting a caller with a plurality of destinations is provided. Process 300 determines if the caller is connectable first prior to determining if a destination is connectable when attempting to connect the caller with the destination. Process 300 can be implemented as a part of a VPA.

In step 302, a destination list having a plurality of destinations is received. For example, when process 300 is implemented in a VPA, such as VPA 240, a caller can utilize an interface on a user device such as on a personal computer 210D to upload a destination list to the VPA, which is executing step 302 of process 300 to receive the destination list. As described above, once the destination list is received by the VPA, it is saved in a data store and can be further edited by the caller or a delegated user. Alternatively, the destination list can be made available to a local VPA 240'.

In step 304, an indication is received to initiate attempts to connect the caller with each destination in the destination list. For example, a caller can trigger the VPA implementing process 300 by entering a command or instruction through an interface on a user device such as on a cell phone 210C.

In step 306, a list pointer (n) is set to zero. A value of zero for the list pointer indicates that no attempts have yet been made to connect the caller with a destination. When the list pointer is set to a value x other than zero, the list pointer refers to the destination which is listed at position x in a destination list. As process 300 attempts to connect a caller with each destination sequentially in the order listed in the destination list, the list pointer is conveniently used to refer to the current destination in the call sequence as specified in the destination list. Other software constructs can be used to index the destination list as understood by persons of skilled in the art.

In step 308, a check is performed to determine if there are any remaining destinations in the destination list that needs to be connected with the caller. If the destination list is empty (in the sense that there are no more destinations to be connected with the caller), process 300 ends at step 310. Otherwise, process 300 continues to step 311.

In step 311, the list pointer is incremented until the list pointer references the next sequential destination in the destination list that needs to be connected with the caller. If the list pointer in incremented beyond the last entry of the destination list, the list pointer is set to zero, in a cyclic manner, and incremented sequentially until the list pointer refers to the next destination in the sequence that needs to be connected with the caller. Upon completion of step 311, the list pointer refers to the current destination for which attempts will be made to connect with the caller.

In step 312, process 300 pauses for a specified period of time, referred to as Delay 1, to enable the caller to rest and handle incoming calls and additional outgoing calls. Such incoming calls may be a result of a callback service such as a CBUNR or CBNASW service that was initiated for an unreachable or unavailable (R/NA) destination. The time period for Delay 1 is configurable by the caller utilizing an interface on a user device, and can include a no delay value.

In step 314, a check is performed to detect whether the current destination is reachable. One system that checks for whether a recipient of a call is reachable is described in U.S. Pat. No. 6,631,270 to Dolan, which is hereby incorporated by reference in its entirety. In the system described by Dolan, a call to a wireless device can be identified as being unreachable when congestion is detected in the cell sites necessary to complete the call. Such an approach can be utilized in accordance with the present invention to identify situations when a caller or a destination is unreachable. If the current destination is reachable, process 300 continues to step 318. Otherwise, process 300 continues to step 308.

In step 318, a call is placed to the caller. In an embodiment, a call is placed with a unique predefined indication such as, for example, a unique ring tone, to differentiate the call from regular incoming calls.

In step 320, process 300 determines whether the caller answered the call. If the caller answers, process 300 proceeds to step 324. Otherwise, process 300 pauses in step 322 for a specified period of time, referred to as Delay 3, before performing another check in step 314 to determine if current destination is reachable. The time period for Delay 3 is configurable by the caller, as described above.

In step 324, an offer is made to the caller to connect with the current destination. The destination is identified to the caller by phone number, name, or any other identifier.

In step 326, a check is performed to determine if the caller has accepted the offer made in step 324. If the offer has been accepted, process 300 proceeds to step 328. Otherwise, the current destination is marked in the destination List as being removed from additional connection attempts in step 327 and process 300 continues to step 308.

In step 328, a call attempt is initiated to the current destination. Steps 330, 332, 334, and 336 of process 300 represent different phases of the call attempt initiated in step 328.

In step 330, a check is performed to detect whether the current destination is reachable. For example, a current destination is reachable if the call attempt initiated in step 328 is detected as being routed to the destination's phone. If the current destination is reachable, process 300 continues to step 332. Otherwise, process 300 handles the situation of an unreachable destination in step 338 utilizing one of the various techniques aforementioned with regard to unreachable destinations. For example, the caller can manually apply for a call completion service such as voicemail or have the VPA executing process 300 automatically apply for a call completion service as described above. Furthermore, as described previously, the current destination can be permanently or temporarily marked as being removed for further connection attempts. After step 338, process 300 continues to step 308.

However, if the current destination is reachable in step 330, then the call attempt will be routed to the destination and the current destination's phone, for example, will start ringing. In step 332, a check is performed to determine if the destination has answered the call attempt. In an embodiment, the caller can monitor or listen to the call as it is being placed to the current destination, for example, when the call is a telephone call.

If the current destination answers the call attempt in step 332, process 300 proceeds to step 334. Otherwise, process 300 handles the situation of a ringing but not answering (R/NA) destination in step 340 utilizing one of the various techniques mentioned above with regard to reachable but not available destinations. For example, an R/NA destination can be handled similarly to the manner in which an unreachable destination is handled as described above in step 338. Thereafter, process 300 proceeds to step 308.

In step 334, the caller and the current destination are connected to allow the caller and the destination to communicate with each other. The caller and the current destination can be connected, for example, by relaying the caller's communication to the destination and vice versa.

In step 336, process 300 waits for the call between the caller and the destination to terminate. For example, process 300 can monitor the connection between the caller and the destination and wait until a disconnect is detected. Optionally, a disconnect due to a loss of service or other interruption can mark the destination on the destination list for an immediate subsequent call connection attempt. In step 342, the current destination is marked on the destination list as no longer requiring any further attempts to be connected to the caller if the call termination was not due to the loss of service, power, and other similar interruptions. Thereafter, process 300 proceeds to step 308.

In an embodiment, after each of the destinations in the destination list has been processed by process 300, any destination that was unreachable or unavailable (or reachable but having the connection lost during the call) and not properly or fully handled by a call completion service can be re-marked as requiring additional connection attempts at step 308 at the direction of the caller. Thereafter, process 300 continues to step 311 to subsequently retry such destinations. A destination that was unreachable or non-answering may not have been properly handled by a call completion service, for example, if the destination did not offer any call completion services or offered only call completion services that were unacceptable to the caller.

Figure 4:
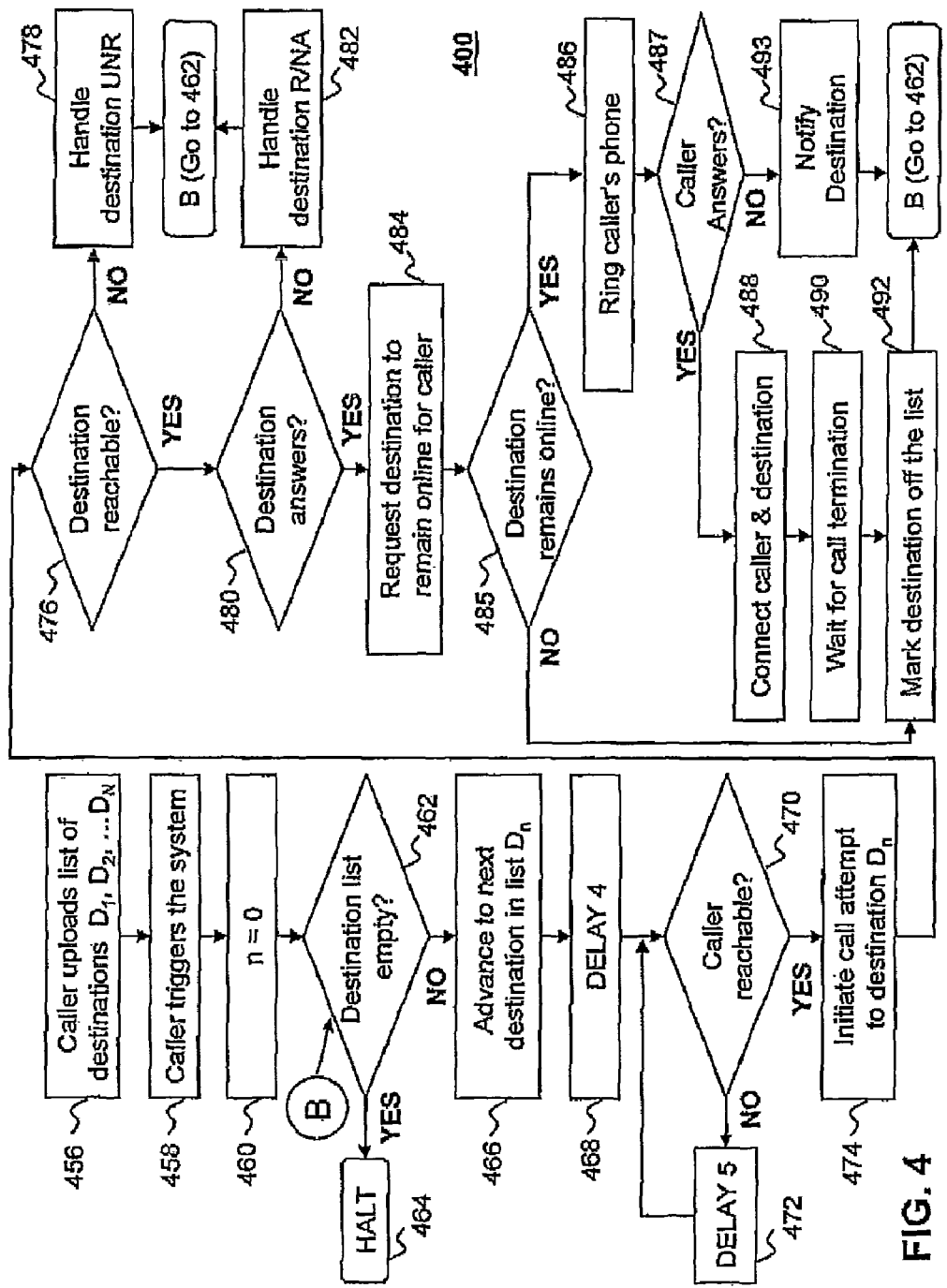
FIG. 4 depicts a flow chart illustrating a process for connecting a caller with a plurality of destinations wherein the connectability of a destination is determined first in accordance with an embodiment of the present invention.

Referring to FIG. 4, a process 400 for connecting a caller with a plurality of destinations is provided. Process 400 determines if a destination is connectable first prior to determining if the caller is connectable when attempting to connect the caller with the destination. Process 400 can be implemented as a part of a VPA.

In step 456, a destination list having a plurality of destinations is received. For example, when process 400 is implemented in a VPA, such as VPA 240, a caller can utilize an interface on a user device such as on a personal computer 210D to upload a destination list to the VPA, which is executing step 456 of process 400 to receive the destination list. As described above, once the destination list is received by the VPA, it is saved in a data store and can be further edited by the caller or a delegated user. Alternatively, the destination list can be made available to a local VPA 240'.

In step 458, an indication is received to initiate attempts to connect the caller with each destination in the destination list. For example, a caller can trigger the VPA implementing process 400 by utilizing an interface on a user device such as on a cell phone 210C.

In step 460, a list pointer (n) is set to zero. A value of zero for the list pointer indicates that no attempts have yet been made to connect the caller with a destination. When the list pointer is set to a value x other than zero, the list pointer refers to the destination which is listed at position x in a destination list. As process 400 attempts to connect a caller with each destination sequentially in the order listed in the destination list, the list pointer is conveniently used to refer to the current destination in the call sequence as specified in the destination list. As noted above, other techniques for managing the state of destinations on the destination list can be used with equal advantage.

In step 462, a check is performed to determine if there are any remaining destinations in the destination list that needs to be connected with the caller. If the destination list is empty in the sense that there are no more destinations to be connected with the caller, process 400 ends at step 464. Otherwise, process 400 continues to step 466.

In step 466, the list pointer is incremented until the list pointer references the next sequential destination in the destination list that needs to be connected with the caller. If the list pointer in incremented beyond the last entry of the destination list, the list pointer is set to zero, in a cyclic manner, and incremented sequentially until the list pointer refers to the next destination in the sequence that needs to be connected with the caller. Upon completion of step 466, the list pointer refers to the current destination for which attempts will be made to connect with the caller.

In step 468, process 400 pauses for a specified period of time, referred to as Delay 4, to enable the caller to rest and handle incoming calls and additional outgoing calls. The time period for Delay 4 is configurable by the caller utilizing an interface on a user device and includes a zero time delay setting, if desired.

In step 470, a check is performed to detect whether the caller is reachable. If the caller is reachable, process 400 continues to step 474. Otherwise, process 400 pauses in step 472 for a specified period of time, referred to as Delay 5, before performing another check in step 470. The time period for Delay 5 is configurable by the caller.

In step 474, a call attempt is initiated to the current destination. Steps 474, 476, 480, 484, 485, 486, 487, 488, and 490 of process 400 represent different phases of the call attempt initiated in step 474.

In step 476, a check is performed to detect whether the current destination is reachable. For example, a current destination is reachable if the call attempt initiated in step 474 is detected as being routed to the destination's phone. If the current destination is reachable, process 400 continues to step 480. Otherwise, process 400 handles the situation of an unreachable destination in step 478 utilizing one of various techniques aforementioned with regard to unreachable destinations. For example, the VPA implementing process 400 can automatically apply for a call completion service as described above. Furthermore, as described previously, the current destination can be permanently or temporarily marked as being removed for further connection attempts. After step 478, process 400 continues to step 462.

However, if the current destination is reachable in step 476, then the call attempt will be routed to the destination and the current destination's phone, for example, will start ringing. In step 480, a check is performed to determine if the destination has answered the call attempt. If the destination answers the call, process 400 proceeds to step 484. Otherwise, process 400 handles the situation of a ringing but not answering (R/NA) destination in step 482 utilizing one of the various techniques aforementioned with regard to reachable but not available destinations. For example, an R/NA destination can be handled similarly to the manner in which an unreachable destination is handled as described above in step 478. Thereafter, process 400 proceeds to step 462.

In step 484, the current destination is requested to wait online for the caller. The caller is identified by name, phone number, or any other identifier.

In step 485, a check is performed to determine whether the current destination is remaining online for the completion of the call attempt. If destination remains online, process 400 proceeds to step 486. Otherwise, process 400 continues to step 492.

If the current destination remains online, the caller is called in step 486 by, for example, ringing the caller's telephone. In step 487, a check is performed to determine if the caller has answered the phone. If the caller has answered the phone, process 400 proceeds to step 488. Otherwise, process 400 continues to step 493.

If process 400 reaches step 493, the caller is determined to be non-answering even though the caller was found to be reachable in step 470 prior to initiating the call attempt in step 474. Accordingly, this condition should be rare. In step 493, process 400 apologetically notifies the current destination that the call attempt could not be completed because the caller is unconnectable. Thereafter, also in step 493, process 400 disconnects the call to the current destination and proceeds to step 462 to handle the next destination in the list. Rather than trying again to complete the call to the current destination, an attempt to connect the caller with the next destination is performed first to avoid repeating with the same destination the unfortunate circumstance of asking the current destination to remain online only to discover that the caller is again not answering.

In step 488, the caller and the current destination are connected to allow the caller and the destination to communicate with each other. The caller and the current destination can be connected, for example, by relaying the caller's communication to the destination and vice versa.

In step 490, process 400 waits for the call between the caller and the destination to terminate. For example, process 400 can monitor the connection between the caller and the destination and wait until a disconnect is detected. In step 492, the current destination can be marked on the destination list as no longer requiring any further attempts to be connected to the caller, for example, whenever the disconnect is a natural call termination and not a termination due to a lossy signal, service, power, or the like. Thereafter, process 400 proceeds to step 462.

In an embodiment, after each of the destinations in the destination list has been processed by process 400, any destination that was unreachable or unavailable and not properly handled by a call completion service can be re-marked as requiring additional connection attempts at step 462 at the direction of the caller. Thereafter, process 400 continues to step 466 to subsequently retry such destinations. A destination that was unreachable or non-answering may not have been properly handled by a call completion service, for example, if the destination did not offer any call completion services or offered only call completion services that were unacceptable to the caller.

It is to be noted that the above embodiments are described with reference to the most general types of communication networks with minimal functionality. In cases where one or more networks linking a caller and a destination provide more advanced features, these embodiments can be implemented to exploit them. For example, if the caller and the destination are on a network that provides continuous reachability monitoring, "caller-first" and "destination-first" embodiments can be implemented to check if both the caller and a destination are reachable prior to calling either the caller or the destination. In another example, in networks that allow for advanced call completion profile determination, such as the one described in the aforementioned U.S. Provisional Application No. 60/706,224, such advanced call completion services can be utilized to handle situations in which the caller or the destination is unreachable or not answering.

The steps described herein and the operation of the VPA can be event driven and not follow the precise order of steps shown in the flow diagrams. The flow diagrams are provided for illustrative purposes to conceptually document the functionality and operation of the various embodiments that can be implemented in accordance with the present invention.

It should be noted further that the following features can be included with any embodiment in accordance with the present invention.

The list uploaded by the caller may include several additional parameters such as the following: the timeframe in which the caller wishes any specific call to take place, times in which the caller doesn't want to make calls, specific handsets to which the calls are to be connected (such as home-phone, office phone, mobile phone, car-phone), phone numbers from which the list can be accessed and edited, passwords with which the list can be edited, methods of connection when attempting connection with any particular destination ("caller-first", "destination-first" or "ring both"), and special conditions for enabling/disabling a call attempt to a particular destination.

Furthermore, the detecting or checking of whether a caller or a destination is reachable is merely a specific case of the more general concept of querying the connectability of a party such as the caller or the destination. Querying the connectability of a party involves checking for any indication relevant to the connectability of the party (e.g., such as busy or unavailable conditions), responsiveness of the party (e.g., such as the party's history of answering or not answering recent calls), or the presence or absence of the party relative to a specific handset.

In an embodiment, it can be possible to determine the reachability of a party without actually attempting a call to the party. In such a case, the order of the steps in FIGS. 3 and 4 can be changed so that step 330 will be performed before step 328 and step 476 will be performed before step 474.

While the invention has been described in connection with a certain embodiment thereof, the invention is not limited to the described embodiments but rather is more broadly defined by the recitations in the claims below and equivalents thereof.

What is claimed:

1. A method of connecting a caller with a plurality of destinations, comprising:
   receiving over a network a destination list having a plurality of destinations;
   storing the destination list within a data store;
   receiving over the network an indication to execute a step of attempting to connect the caller with each of the plurality of destinations;
   attempting to connect the caller with each of the plurality of destinations included in the data store, wherein attempting to connect the caller with a particular destination among the plurality of destinations includes:
      retrieving the stored destination list associated with the caller;
      determining a connectability of a first party, wherein the first party is one of the caller or the particular destination;
      offering to a second party a connection attempt to the first party, wherein the second party is the other of the caller or the particular destination; and
      automatically initiating a connection attempt between the first party and the second party if the second party accepts the offer; and
   initiating the step of attempting to connect the caller with destinations among the plurality of destinations other than the particular destination.

2. The method of claim 1 wherein the first party is the caller and the second party is the particular destination.

3. The method of claim 1 wherein the first party is the particular destination and the second party is the caller.

4. The method of claim 1, wherein the step of attempting to connect the caller with the particular destination further includes:
   removing the particular destination from the stored destination list if the second party declines the connection offer.

5. The method of claim 1, wherein the step of determining the connectability comprises:
   (a) querying the connectability of the first party to obtain a response;
   (b) if the response indicates that the first party is not connectable, pausing for a duration; and
   (c) repeating steps (a)-(b) until the response indicates that the first party is connectable.

6. The method of claim 1, wherein the step of attempting to connect the caller with each of the plurality of destinations includes attempting to connect the caller with each of the plurality of destinations sequentially according to the order in which each destination is listed in the stored destination list.

7. The method of claim 6, wherein the step of attempting to connect the caller with the particular destination further includes:
   demoting the particular destination in the stored destination list if the particular destination is not available.

8. The method of claim 1, wherein the step of attempting to connect the caller with a particular destination among the plurality of destinations, further includes:
   determining whether the caller was offered a call completion service and has accepted it; and
   if caller was offered a call completion service and has accepted it, removing the particular destination from the stored destination list.

9. The method of claim 1, wherein the step of attempting to connect the caller with the particular destination further includes:
   detecting that the connection between the caller and the particular destination has been deliberately terminated; and
   removing the particular destination from the stored destination list.

10. The method of claim 1, further comprising:
    receiving a calendar information associated with the caller;
    storing the calendar information within the data store; and
    determining a time when the caller is likely to be connectable based on the stored calendar information,
       wherein the step of attempting to connect the caller with each of the plurality of destinations is performed at the determined time.

11. The method of claim 1, further comprising:
    receiving an edited destination list to replace the stored destination list; and
    replacing the stored destination list in the data store with the edited destination list.

12. The method of claim 1, further comprising:
    detecting that the caller has successfully completed an incoming call from one of the plurality of destinations included in the stored destination list; and
    removing the detected destination from the stored destination list.

13. The method of claim 1, further comprising:
    receiving an indication to execute the step of attempting to connect the caller with each of the plurality of destinations, and
    wherein the step of attempting to connect the caller with each of the plurality of destinations is initiated based on the indication.

14. The method of claim 1, further comprising:
    receiving an indication to pause the step of attempting to connect the caller with each of the plurality of destinations, and
    wherein the step of attempting to connect the caller with each of the plurality of destinations is paused based on the indication.

15. The method of claim 1, wherein the step of connecting the caller with each of the plurality of destinations further includes:
    pausing for a duration between attempting to connect the caller with one destination among the plurality of destinations and attempting to connect the caller with another destination among the plurality of destinations.

16. The method of claim 1, wherein the destination list includes a call time for each of the plurality of destinations, and wherein the step of attempting to connect the caller with the particular destination further includes:
    waiting until the call time associated with the particular destination prior to determining the connectability of the first party.

17. The method of claim 16, wherein the destination list further includes a condition for each of the plurality of destinations, and wherein the step of attempting to connect the caller with the particular destination further includes:
    evaluating whether the condition associated with the particular destination is satisfied prior to determining the connectability of the first party.

18. The method of claim 1, wherein the destination list includes a condition for each of the plurality of destinations, and wherein the step of attempting to connect the caller with the particular destination further includes:
    evaluating whether the condition associated with the particular destination is satisfied prior to determining the connectability of the first party.

19. A method of connecting a caller with a plurality of destinations, comprising:
- receiving over a network a destination list having a plurality of destinations;
- storing the destination list within a data store;
- receiving over the network an indication to execute steps of attempting to connect the caller with each of the plurality of destinations;
- attempting to connect the caller with each of the plurality of destinations included in the data store, wherein attempting to connect the caller with a particular destination among the plurality of destinations includes:
- retrieving the stored destination list associated with the caller;
- determining a connectability of the caller;
- determining a connectability of the particular destination;
- calling the caller;
- calling the particular destination;
- detecting which party answers first, wherein the party is one of the caller or the particular destination;
- offering the party a connection attempt to the other party; and
- initiating the step of attempting to connect the caller with destinations among the plurality of destinations other than the particular destination.

20. A system for connecting a caller with a plurality of destinations, comprising:
- at least one processor
- a data store;
- a plurality of modules executing in one or more of the processors, at least one of which has access to the data store, including:
  - a first module operative to receive over a network connection a destination list having a plurality of destinations;
  - a second module operative to store the destination list within a data store; and
  - a third module operative to attempt to connect a caller with each of the plurality of destinations included in the data store, wherein the third module attempts to connect the caller with a particular destination in the plurality of destinations through interaction with:
    - a fourth module operative to determine a connectability of a first party, wherein the first party is one of the caller or the particular destination;
    - a fifth module operative to offer to a second party a connection attempt to the first party, wherein the second party is the other of the caller and the particular destination; and
    - a sixth module operative to automatically initiate a connection attempt between the first party and the second party if the second party accepts the offer,
- wherein the third module is further operative to:
  - receive over the network an indication to execute the attempt to connect the caller with each of the plurality of destinations
  - retrieve the stored destination list associated with the caller, and
  - initiate the automatic initiation of the connection attempt by the sixth module with destinations among the plurality of destinations other than the particular destination.

21. The system of claim 20, wherein each module comprises software code.

* * * * *